Aug. 24, 1926.
F. W. ANDREW
1,597,172
OSCILLATOR FOR MAGNETOS
Filed Oct. 3, 1921   2 Sheets-Sheet 1
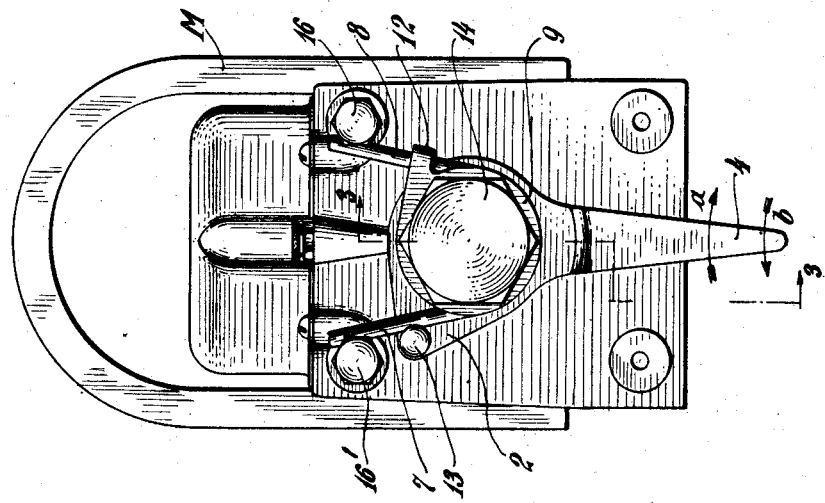
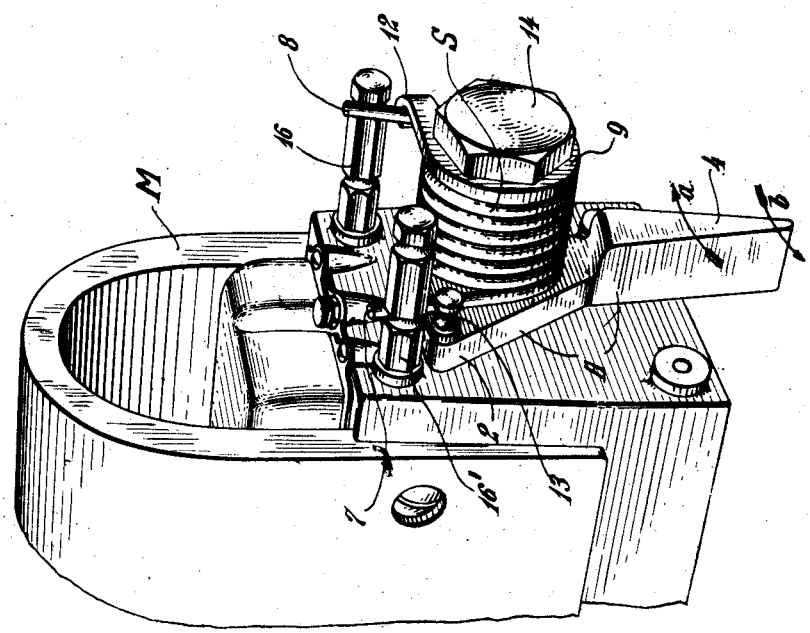
Inventor
Frederich W. Andrew
By his Attorney

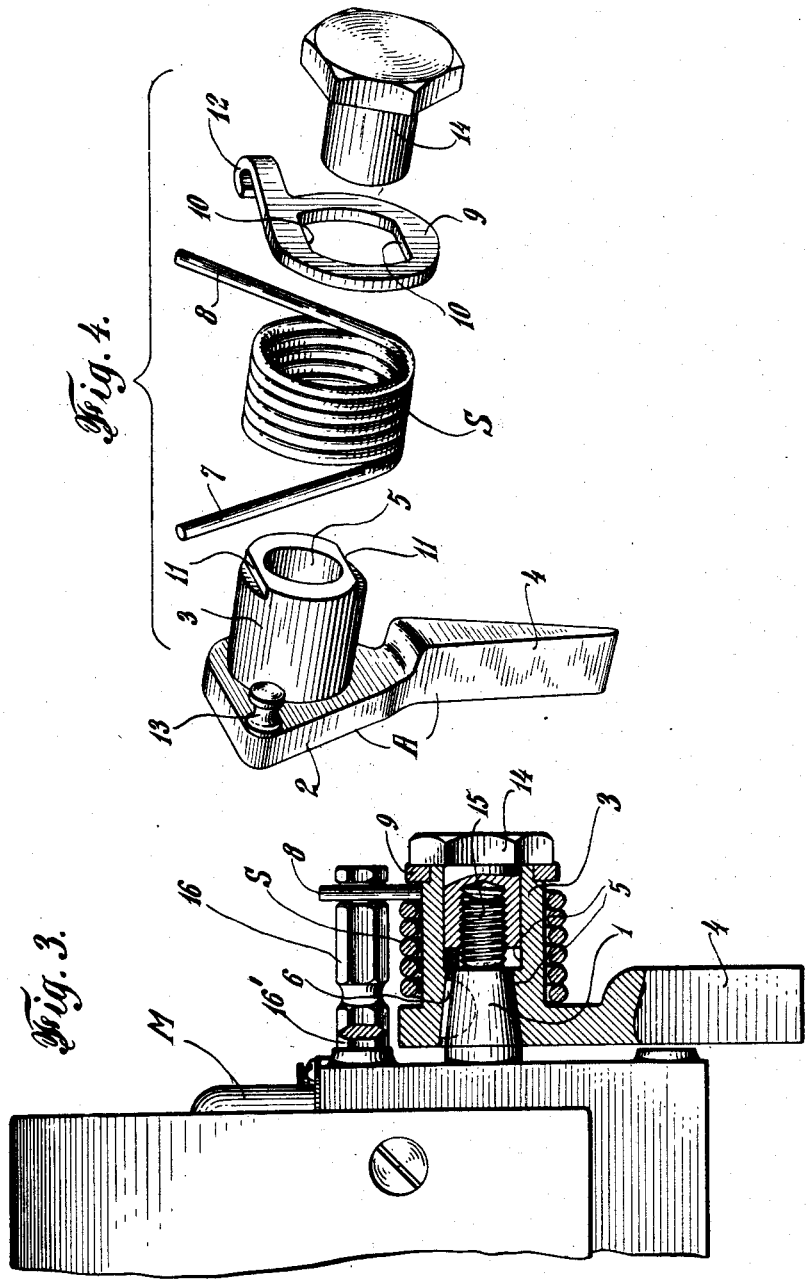

Patented Aug. 24, 1926.

1,597,172

UNITED STATES PATENT OFFICE.

FREDERICK W. ANDREW, OF BROOKLYN, NEW YORK, ASSIGNOR TO EISEMANN MAGNETO CORPORATION, OF BROOKLYN, NEW YORK, A CORPORATION OF NEW YORK.

OSCILLATOR FOR MAGNETOS.

Application filed October 3, 1921. Serial No. 504,935.

My invention relates to oscillators for magnetos, and its object is to produce an oscillator marked by simplicity of construction, cheapness of manufacture and certainty of operation.

In my new oscillator I employ a single torsional spring arranged to be tensioned in either direction and to absorb the shock as the actuating arm comes to rest. The advantages of my invention will become clear from a detailed description of the accompanying drawings, which illustrate a preferred embodiment of my invention. In these drawings:

Figure 1 shows in perspective a portion of a magneto to which my new oscillator is attached;

Fig. 2 is an end view of the mechanism shown in Fig. 1;

Fig. 3 is a side view of the oscillator, certain parts being shown in cross-section approximately on line 3—3 of Fig. 2; and Fig. 4 is a perspective view of certain parts of the oscillator in disassembled relation.

As my oscillator may be attached to any suitable form or type of magneto, I have not deemed it necessary to show any particular magneto construction and it will be sufficient to say that M represents any suitable type of ignition magneto. On the projecting end of the magneto shaft 1, which is usually the armature shaft, is mounted a trip lever or arm indicated as a whole by A. In the particular embodiment illustrated, this arm is made as a single piece comprising a body portion 2, a sleeve or hub portion 3 and an extension 4. The arm A is provided with an opening 5 which fits over the end of the shaft 1, as best shown in Fig. 3. A key 6, or other suitable means, may be employed to mount the arm A rigidly on the magneto shaft so as to rotate therewith. The extension 4 is arranged to project in the path of a suitable actuating member, such as a cam device driven from an engine shaft for operating the oscillator, as will be well understood by those skilled in the art. On the sleeve 3 is mounted a coiled torsional spring S having projecting ends 7 and 8. On the outer end of the sleeve 3 fits a catch-plate 9. The flat portions 10 of the catch-plate 9 fit into correspondingly shaped shoulders 11 on the sleeve 3, whereby the catch-plate is rigidly connected with the sleeve so as to turn therewith. The catch-plate 9, which may conveniently be stamped out of sheet metal, is provided with an extension which terminates in a lug or catch 12. The arm A is provided with a lug or projection 13. When the torsional spring S is placed on the sleeve 3, the upstanding end 7 of the spring is made to engage the lug 13. When the catch-plate 9 is mounted on the outer end of the sleeve 3, the other end 8 of the spring is forced into engagement with the lug 12. The angular position of the lugs 12 and 13 and the normal set of the spring S are so related that when the ends 7 and 8 of the spring are in engagement with the lugs 13 and 12, respectively, the spring will be under initial tension. The arm A is locked on the magneto shaft 1 by suitable means, such as a nut 14 adapted to engage the screw-threaded extension 15 of the magneto shaft, as best shown in Fig. 3. The nut 14 also holds the catch-plate 9 in place on the sleeve 3.

There is also provided a pair of fixed stops 16 and 16' which are conveniently attached to the casing of the magneto. These stops are so constructed and arranged as to engage the projecting ends 7 and 8 of the spring S in line with the lugs 12 and 13, as best shown in Figs. 1 and 2.

The operation of my oscillator will be clear from the foregoing and may briefly be described as follows:

The spring S normally holds the trip arm or lever A in the position shown in Figs. 1 and 2. When the arm A is actuated to one side or the other by the usual cam device, eccentric roller or trip mechanism, which is driven from the engine shaft through suitable connections, the coils of the spring S are placed under further torsional strain, so that when the arm is released the spring S imparts an accelerated reverse rotation to the magneto shaft 1, thereby producing the required spark, in a manner well understood by those familiar with the electrical ignition art. When the arm or lever A returns to normal position, there is, of course, a shock or rebound; but this is absorbed by the spring S, which acts as a buffer and quickly compels the arm to resume a normal position. Referring to Figs. 1 and 2, when the arm is actuated in the direction of the arrow $a$, the spring end 8 is carried along by the lug 12 and moves away from the stop 16. At the same time, the end 7 is pressed against its associated stop 16' and the lug 13 is free to move away from the end 7. In this way, the ends 7 and 8 are brought closer together in their angular relation, whereby the coils of the spring are placed under stress by a torsional strain. When the trip arm A is actuated in the direction of the arrow $b$, in Figs. 1 and 2, the lug 13 carries the end 7 of the spring away from the adjacent stop 16', while the end 8 is held fixed against the other stop 16, thus compressing the coils of the spring as before. As soon as the arm A is released after operation in either direction, the tensioned spring gives the armature a quick rotation or "kick" (as the shopmen call it) in the reverse direction.

It will be seen from the foregoing that I have produced an exceedingly simple construction, consisting of only a few parts which can be cheaply made, are not liable to break and are easily assembled and taken apart. Should it happen that any part breaks, it is easily and quickly replaced by another. My new oscillator does away with delicate parts and is reduced to rugged simplicity. It will be observed that the spring S is entirely free from sharp ends, such as are present in the springs of prior devices of this class. These sharp bends are practically the main source of trouble in those prior structures. It will also be seen that the spring S is self-sustaining and practically free from friction. By this I mean that the spring does not require any housing or other surrounding support to maintain the coils of the spring in proper position. For instance, in oscillators heretofore constructed, coiled compression springs have been employed, and as these springs had to be curved bodily into a circle or part of a circle, it was necessary to provide a correspondingly shaped housing or casing for the spring. But it was found that in the operation of the spring, the coils would rub against the inside wall of the housing and this friction would soon wear the coils away to a point of breakage. This serious objection is wholly eliminated in the torsional spring of my invention. Furthermore, the device as a whole is compact and can be attached to any standard magneto on the market. No part of the oscillator projects beyond the outline of the magneto (as viewed from the end), except the extension 4 of the trip arm A, and this makes it possible to mount the magneto with the attached oscillator in places not available with prior constructions.

While I have herein shown and described a specific embodiment of my invention, I would have it understood that I have done so merely by way of illustration. The particular apparatus shown in the drawings represents what I consider at the present time a preferred form which I have actually tried out and found successful, but it will be clear to those skilled in the art that the idea of my invention may be mechanically carried out in other ways.

Having thus described my invention, what I claim is:

1. In a magneto, an oscillator comprising a torsional spring mounted on the magneto shaft so as to rotate therewith, means engaging the ends of said spring to hold the same under initial tension, stops arranged to engage the ends of said spring, and an arm for actuating said shaft to place said torsional spring under further tension and thereby cause an accelerated movement of said shaft in the reverse direction when said arm is released, said stops holding said arm in a predetermined normal position through the medium of said spring.

2. In a magneto, an oscillator comprising a sleeve rigidly mounted on the magneto shaft and provided with a pair of lugs, a coiled torsional spring mounted on said sleeve, the ends of said spring engaging said lugs, fixed stops arranged to engage the ends of said spring, and an arm for actuating said shaft and placing said spring under tension.

3. An oscillator for magnetos, comprising a sleeve adapted to be rigidly mounted on a magneto shaft, a torsional spring having a coiled body portion mounted on said sleeve and having oppositely extending ends, means connected with said sleeve for engaging the ends of said spring to hold the same under initial tension, stops arranged to engage the ends of said springs, and an actuating arm operatively connected with said sleeve.

4. In an oscillator for magnetos, a torsional spring mounted on the magneto shaft and held under initial tension, said torsional spring comprising a coiled body portion having oppositely extending ends, means for connecting said spring with the magneto shaft, stops arranged to engage the ends of said spring, and an arm for twisting the coils of said spring to further tension the same, whereby an accelerated reverse movement is imparted to the magneto shaft by the tensioned spring when said arm is released.

5. In an oscillator for magnetos, an arm provided with a sleeve adapted to be rigidly mounted on a magneto shaft, a lug on said arm at one end of said sleeve, a second lug at the other end of said sleeve, a torsional spring having a coiled body portion mounted on said sleeve, the opposite ends of said spring extending into engagement with said lugs, and stops arranged to engage the ends of said spring, whereby the operation of said arm in either direction places said spring under tension.

6. In an oscillator for magnetos, an arm provided with a sleeve adapted to be rigidly mounted on a magneto shaft, a lug on said arm at one end of said sleeve, a member detachably connected to the other end of said sleeve, a lug on said member, a torsional spring having a coiled body portion mounted on said sleeve, the opposite ends of said spring extending into engagement with said lugs, and stops arranged to engage the ends of said spring, whereby the operation of said arm in either direction places said spring under tension.

7. An oscillator for magnetos, comprising a sleeve rigidly mounted on the magneto shaft, a lug at one end of said sleeve, a second lug at the other end of said sleeve, a torsional spring having a coiled body portion mounted on said sleeve, the opposite ends of said spring extending into engagement with said lugs, and means for imparting a torsional strain to said spring in either direction, whereby the release of said spring produces an accelerated return movement of the magneto shaft.

8. An oscillator for magnetos, comprising an arm provided with a sleeve rigidly mounted on the magneto shaft, a lug on said arm at one end of said sleeve, a plate fitting over the other end of said sleeve so as to rotate therewith, said plate having an extension to form a lug, means for holding said plate in place, a torsional spring having a coiled body portion mounted on said sleeve, the opposite ends of said spring engaging said lugs, and stops arranged to engage the ends of said spring, whereby the operation of said arm in either direction places said spring under torsional strain, so that the release of said arm produces an accelerated reverse rotation of the magneto shaft under the action of said spring.

FREDERICK W. ANDREW.